(12) United States Patent
Tsang et al.

(10) Patent No.: US 10,920,135 B2
(45) Date of Patent: Feb. 16, 2021

(54) PREPARATION METHOD OF AN LED ILLUMINATING DEVICE

(71) Applicant: SHENZHEN YMH INTELLIGENT TECHNOLOGY CO., LTD, Guangdong (CN)

(72) Inventors: Jy Tsang, Guangdong (CN); Gq Tang, Guangdong (CN); Ada Tsang, Guangdong (CN)

(73) Assignees: Shenzhen YMH Intelligent Technology Co., Ltd., Guangdong (CN); Gq Tang, Guangdong (CN)

( * ) Notice: Subject to any disclaimer, the term of this patent is extended or adjusted under 35 U.S.C. 154(b) by 0 days.

(21) Appl. No.: 16/321,046

(22) PCT Filed: Nov. 30, 2016

(86) PCT No.: PCT/CN2016/108040
§ 371 (c)(1),
(2) Date: Jan. 28, 2019

(87) PCT Pub. No.: WO2018/098690
PCT Pub. Date: Jun. 7, 2018

(65) Prior Publication Data
US 2019/0169497 A1    Jun. 6, 2019

(51) Int. Cl.
| | |
|---|---|
| *C09K 11/59* | (2006.01) |
| *F21V 23/00* | (2015.01) |
| *F21K 9/238* | (2016.01) |
| *C09K 11/02* | (2006.01) |
| *F21K 9/20* | (2016.01) |
| *F21K 9/90* | (2016.01) |
| *C09K 11/71* | (2006.01) |

(52) U.S. Cl.
CPC .............. *C09K 11/59* (2013.01); *C09K 11/02* (2013.01); *C09K 11/71* (2013.01); *F21K 9/20* (2016.08); *F21K 9/238* (2016.08); *F21K 9/90* (2013.01); *F21V 23/00* (2013.01); *F21V 23/003* (2013.01)

(58) Field of Classification Search
None
See application file for complete search history.

(56) References Cited

U.S. PATENT DOCUMENTS

| | | | | |
|---|---|---|---|---|
| 2011/0299284 | A1* | 12/2011 | Van De Ven | F21V 5/002 362/293 |
| 2014/0301062 | A1* | 10/2014 | David | F21V 9/30 362/84 |
| 2017/0011670 | A1* | 1/2017 | van de Ven | F21K 9/60 |

FOREIGN PATENT DOCUMENTS

| | | |
|---|---|---|
| CN | 1539914 A | 10/2004 |
| CN | 103305216 A | 9/2013 |
| CN | 104279450 A | 1/2015 |
| CN | 104513628 A | 4/2015 |
| CN | 105240748 A | 1/2016 |

(Continued)

*Primary Examiner* — Britt D Hanley

(57) ABSTRACT

An LED illuminating device and a preparation method therefor. The device is characterized by comprising an LED component (101), an LED circuit board (100), a heat dissipator (200), and a power supply controller (400). The LED component (101) is disposed on the LED circuit board (100), the LED circuit board (100) is disposed above the heat dissipator (200), and the power supply controller (400) is connected to the LED circuit board (100) by means of a conductive wire. The LED illuminating device can emit approximate natural light.

5 Claims, 1 Drawing Sheet

(56) References Cited

FOREIGN PATENT DOCUMENTS

| CN | 105601258 A | 5/2016 |
| CN | 106764483 A | 5/2017 |

* cited by examiner

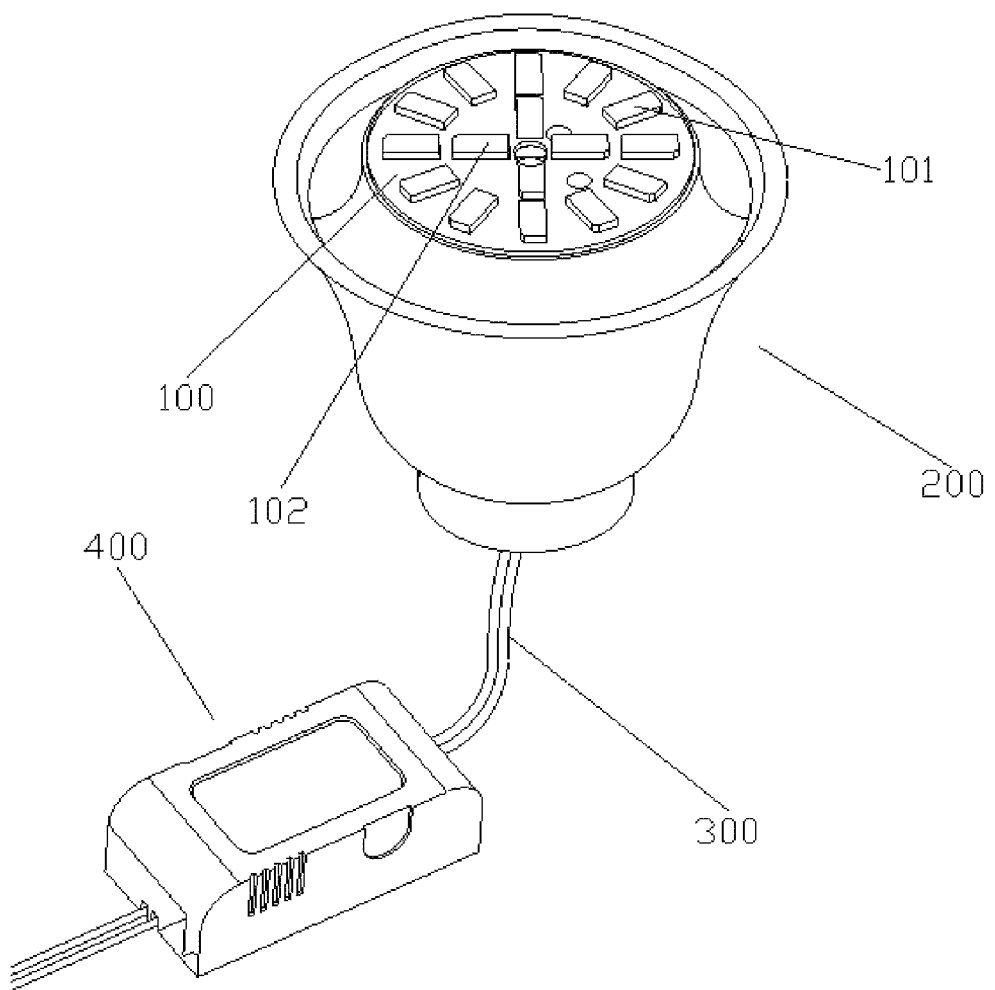

PREPARATION METHOD OF AN LED ILLUMINATING DEVICE

FIELD OF THE INVENTION

The invention relates to an LED illuminating device and preparation method.

BACKGROUND

During the development of human beings, lighting sources have experienced firelight, oil lamp, incandescent light, fluorescent lamp, and (LED) semiconductor lighting up to now. However, these lighting sources have defects in the spectrum, which cannot meet the needs of health lighting. As it is known to all, the best lighting is natural light. Therefore, the pursuit of natural light lighting has always been the goal of the lighting industry.

LED energy-saving lamps have unparalleled advantages over traditional lighting sources in many ways, which are mainly reflected in high luminous efficiency, long working life, durability, low voltage and low current drive, safe and reliable operation, saving energy and electricity, environmental protection, shockproof, waterproof, small size, convenient light control, rich luminous colors, wide color range, concentrated light beams, fast response, intelligent and networked control and regulation, etc. Its special advantages are in line with the "green" standard of modern society and the rapid development process of emerging science and technology.

The industrial realization of white light is by coating fluorescent powder on the LED chip, which is the white light converted from fluorescence. The fluorescent powder is one of the key technologies and raw materials in white light. There are two conditions that must be satisfied when selecting fluorescent powder. First, the excitation spectrum of the fluorescent powder must match the emission spectrum of the selected chip, which can ensure higher light conversion efficiency. Second, The emission spectrum of the fluorescent powder emits white light motivated by ultraviolet or near ultraviolet, or combines with the chip-emitting blue light to form white light. Therefore, the development of fluorescent powder has evolved from less unstable sulfides and halides to aluminates, silicates, tungstate, platinate, phosphate, and nitrogen oxide fluorescent materials which are characterized with better chemical stability, higher thermal crushing temperature or better thermal stability. At present, the mainstream of white light lamps in the market is still white light mainly formed by compounding blue chips with yellow fluorescent powder. However, due to the lack of red light component in its emission spectrum, the value of the CRI is too low. For example, light with about 4000K color temperature and driven by positive current, the lighting effect is up to 120 lm/W, but due to short of red light, its CRI is only about 80. The value of R9 is about 10, so the white light illumination effect obtained is not real enough. In order to make up for the defect due to lack of red light, researchers at home and abroad focus on improving spectrum performance by using red light chip to compensate red light or adding red fluorescent powder. Relatively speaking, sulfide, sulfur oxides and halide fluorescent powder have the defects of low luminous efficiency and poor stability. Therefore, high efficiency, high stability and long working time and natural light lighting have always been the goal of the lighting industry.

SUMMARY OF THE INVENTION

The aim of the invention patent hereof is to provide an LED illuminating device and a preparation method, which can provide approximate natural light.

The invention adopts the following technical scheme:

An LED illuminating device, wherein the device comprises LED components (101), LED red light source (102), an LED circuit board (100), a heat dissipator (200) and a power supply controller (400); the LED components (101) and the LED red light source (102) are disposed on the LED circuit board, the LED circuit board is disposed above the heat dissipator, and the power supply controller is connected to the LED circuit board by means of a conductive wire (300).

The LED illuminating device according to claim 1, wherein the LED components are used for providing an LED white light source.

The LED illuminating device according to claim 1, wherein the power supply controller is connected to the LED circuit board by means of a conductive wire (300), and the power supply controller is also connected with an external power input line.

The preparation method of the LED illuminating device according to any one of right claims 1 to 3, includes the following steps:

Step 1: Adopt the board of sapphire as base board for the LED circuit board, and make it into LED circuit board (100);

Step 2: Deposit evenly multilayer LED fluorescent thin films on the LED components;

Step 3: Determine the power of the LED illuminating device according to the spectrum design requirements of the LED illuminating device;

Step 4: Calculate the number of LED components selected and the number of LED red light sources according to the required LED illuminating device.

The preparation method of the LED illuminating device according to claim 4, wherein, the preparation method of the sapphire described in Step 1 includes the following steps:

a) Preparation of raw materials: adopt $\alpha$-$Al_2O_3$ as main raw material, add cubic BN, Nano $ZrO_2$ and Nano $TiO_2$, and mix the above materials in a mixing machine for 15-30 minutes; the mass ratio of $\alpha$-$Al_2O_3$, cubic BN, Nano $ZrO_2$ and Nano $TiO_2$ is 10-25:2-5:2-3:1-4;

b) Put the raw materials into a crystal growth furnace, make it vacuum and add helium gas, heat it to 2000-2100° C. to melt the raw materials into molten state melt, and keep the temperature for 4-5 hours after melting;

c) On the upper part of the crystal growth furnace is a mould, the cross section of which is circle, and the center of which has a small hole. Through capillary action of the small hole, the melt is led into the top end of the mould; choose directional seed crystal in C-direction to pull the melt to promote crystal growth; during the process, the surface temperature of the melt is controlled to be 2089° C., and the pulling speed is 10-20 mm/h; reduce the temperature to 1480-1570° C. after the growth of crystal; then cool the crystal after preserving the heat for 15-30 minutes. Control the rate of reducing the temperature at 30-60° C./h to obtain the crystal;

d) Cut the crystal rod with cutting equipment to obtain wafer with the required shape;

e) Grinding: Grind the wafer with a grinding machine. Add self-made grinding fluid when grinding and pressurize the wafer to 0.025-0.027 Mpa by grinding disc, the rotation speed of which is 1000-1200 rpm/min; clean with absolute ethyl alcohol after grinding;

f) Annealing: Put the wafer into the annealing furnace; firstly, raise the temperature to 500° C. and hold for 1-2 hours, then raise the temperature to 800° C. and hold for 2-4 hours, and then raise the temperature to 1600° C. and hold for 2-4 hours; secondly, reduce the temperature at the rate of 210-220° C.; reduce the temperature to 1300° C. and hold for 0.5-1 hour, then reduce the temperature to 1000° C. and hold for 1-2 hours, and then reduce the temperature to 600° C. and hold for 1-3 hours; lastly, cool the temperature to room temperature at a speed of 20-40° C./h and take out the wafer;

g) Polishing: Wash the wafer by absolute ethyl alcohol for 3-5 times, and put it into a polishing machine and fix it; add polishing liquid during polishing; the rotating speed of the polishing disc is 1000-1500 rpm/min; rinse the polished wafer with absolute ethyl alcohol and then cool it naturally at room temperature.

The preparation method of the LED illuminating device according to claim 5 wherein the particle diameter of the $\alpha$-$Al_2O_3$ raw material described in the step a) is 0.5-5 μm, and the density is 3.98 g/cm$^3$; the grinding liquid described in step e) consists of carborundum particles of 0.1-2 μm, $Al_2O_3$ particles of 1-μm, Poly $\alpha$-olefins, N, N-Ethylene diesteramide and deionized water, the mass ratio of the carborundum particles, the $Al_2O_3$ particles, the Poly $\alpha$-olefins, the N, N-Ethylene diesteramide and the deionized water is 1-5:1-5:5-10:3-6:30-50; the polishing liquid described in step g) consists of cerium oxide micron particles, alkyl glycoside, hydroxymethyl cellulose sodium, glycerol, hydroxyethyl diamine and deionized water. The mass ratio of cerium oxide particles, alkyl glycoside, hydroxymethyl cellulose sodium, glycerol and deionized water is 1-5:10-15:6-8:5-10:30-50. Hydroxyethyl diamine is used to control the pH of the polishing liquid so that the polishing liquid is an alkaline solution with a pH value of 8-10.

The preparation method of the LED illuminating device according to claim 4, wherein, in step 2, depositing an evenly multilayer LED fluorescent film on the LED components includes the following steps:

(1) Preparation of Red Fluorescent Materials:

The raw material uses $Gd(NO_3)_3 \cdot 6H_2O$, $Li_2CO_3$, $MgCO_3$, $Nb_2O_5$, $H_3BO_3$, $Sm_2O_2$, $Na_2CO_3$ and deionized water; the molar ratio of $Gd(NO_3)_3 \cdot 6H_2O$, $Li_2CO_3$, $MgCO_3$, $Nb_2O_5$, $H_3BO_3$, $Sm_2O_2$ and $Na_2CO_3$ is (1−x−y):1-2:1-2:1-2:1-2:x:y ($0.01 \leq x \leq 0.08$, x/y=1-2); the mass ratio of $Gd(NO_3)_3 \cdot 6H_2O$ and deionized water is 1:1-2; add $Gd(NO_3)_3 \cdot 6H_2O$, $Li_2CO_3$, $MgCO_3$, $Nb_2O_5$, $Sm_2O_2$ and $Na_2CO_3$ into deionized water to form a turbid liquid; Stir the turbid liquid at the condition of 50-60° C. for 30-45 minutes and dropwise add $H_3BO_3$; after that, rinse the sediment with deionized water for 3-5 times and dry it in the drying case; blend evenly the dried materials by ball-milling and put into crucible for sintering for 4-5 hours at 450° C. in the heating chamber; raise the temperature to 1000-1200° C. and bake for 15-20 hours, then naturally cool the temperature to room temperature; grind the baked product to obtain the $Gd_{1-x-y}Li_3Mg_2(NbO_6)(BO_3)$:$xSm^{3+}$,$yNa^{1+}$.

(2) Preparation of Green Fluorescent Materials:

a) Weigh and take $BaCO_3$, $SiO_2$ and $Tb_2O_3$, put them into container and add ethanol and then place them into a crucible after mixing and fully grinding; put the crucible in a sintering furnace, raise the temperature to 1200~1300° C. with nitrogen, and conduct sintering for 3-6 hours (the gas flow rate of the nitrogen is 30 ml/min); reduce the temperature to 900° C. for sintering for 2 hours, and cool to obtain an intermediate $Ba_{1.94}SiO_4$:0.06 $Tb^{3+}$; the molar ratio of $BaCO_3$, $SiO_2$ and $Tb_2O_3$ is 1-2:1-2:0.01-0.1; the mass ratio of BaCO3 and ethanol is 1:2-3;

b) Blend the intermediate $Ba_{1.94}SiO_4$:0.06 $Tb^{3+}$, $\alpha$-$Si_3N_4$ and $Ce_2O_3$, and then add $H_3BO_3$; grind the above components and put into a molybdenum crucible, and transfer the molybdenum crucible into a high temperature furnace; sinter at 1400° C. for 3-6 hours in the condition of $N_2$:$H_2$=95:5 (the gas flow rate is within 25 ml/min); after that, cool to room temperature and take out, obtaining synthesizing powder $Ba_{0.92}Si_2O_2N_2$:0.06 $Tb^{3+}$, 0.02 $Ce^{3+}$; place the powder into isopropanol (the mass ratio of the powder and isopropanol is 1:1-2) and disperse it with ultrasonic crusher for 1-2 hours; dry the dispersed powder to obtain nitrogen oxide of green fluorescent powder $Ba_{0.92}Si_2O_2N_2$:0.06 $Tb^{3+}$, 0.02 $Ce^{3+}$; the mass ratio of $Ba_{1.94}SiO_4$:0.06 $Tb^{3+}$, $\alpha$-$Si_3N_4$ and $H_3BO_3$ is 2-4:1-2:0.01-0.1; the molar ratio of Tb element and Ce element is 3:1;

(3) Preparation of Blue Fluorescent Materials:

a) Blend $BaCO_3$, MgO, $CaCO_3$, $NH_4H_2PO_4$, Tm$(NO_3)_3 \cdot 5H_2O$ with a molar ratio of 1−n:1:1:2:n in an agate mortar, add compound auxiliary agent and grind for 40-60 minutes, take out and put into a crucible; conduct pre-sintering at 900° C. for 2-3 hours, take out the sample after natural cooling and grind furtherly for 40-60 minutes; put the sample into the crucible again, sinter at 1200° C. for 3-6 hours under the condition of $N_2$:$H_2$=95:5, and then naturally cool to room temperature, obtaining blue fluorescent powder of $Ba_{1-n}MgCa(PO_4)_2$:$nTm^{3+}$;

b) Change the property of blue fluorescent powder: add distilled water to the previously prepared $Ba_{1-n}MgCa(PO_4)_2$:$nTm^{3+}$ to form turbid solution after fully dispersing; add sol and make into a mixture; after dispersing it with ball-milling for 30-60 minutes, dry it at 100° C.; and then place at 500° C. for 2-3 hours, obtaining the blue fluorescent material that has change property; the mass ratio of blue fluorescent powder, distilled water and $MgF_2$ sol is 1-2:2-3:0.05-0.5.

(4) Deposit the first layer of red fluorescent material, the second layer of green fluorescent material and the third layer of blue fluorescent material on the LED components respectively by a Chemical Vapor Deposition Method to form an LED fluorescent film.

8. The preparation method of the LED illuminating device, wherein, in the preparation of the red fluorescent material, x=0.02 and y=0.02; the obtained red fluorescent material is $Gd_{0.96}Li_3Mg_2(NbO_6)(BO_3)$: 0.02$Sm^{3+}$, 0.02 $Na^{1+}$; the particle size of the material is less than 10 μm, of which the size of 1-6 μm accounts for 75%; in the preparation of the blue fluorescent material, n=0.03. The obtained blue fluorescent powder is $Ba_{0.97}MgCa(PO_4)_2$: 0.03$Tm^{3+}$; the compound auxiliary agent consists of $H_3BO_3$+$BaF_2$ with a mass ratio of 1:1 and its mass is 10% of $BaCO_3$; the particle size of the blue fluorescent powder is less than 10 μm, of which the size of 1-5 μm accounts for 70%.

9. The preparation method of the LED illuminating device, wherein, in step 2, three layers of LED fluorescent films are evenly deposited on the LED components.

Beneficial Effect:

(1) The preparation method of the sapphire crystal of the invention hereof comprises the following steps namely sequentially cutting, grinding, annealing and polishing, which can improve the production efficiency of grinding and polishing. Annealing before polishing is benefit for eliminating interior stress generated by wire cutting, grinding and other mechanical processing, so that wafers are not easy to crack during polishing, and rate of finished products is effectively improved;

(2) Strictly control the interface temperature, pulling speed, rotation speed and annealing parameters during crystal growth so as to make the crystal with high production capacity, low defect density, good quality and high yield, thus greatly reducing the production cost;

(3) The sapphire crystal hereof has transparent appearance, high light transmittance and no scattering particles inside. After doping with cubic BN, Nano-$ZrO_2$ and Nano-$TiO_2$, the crystal has good fracture toughness, high light transmittance, high temperature resistance and other excellent performance. At the same time, in the growth process of titanium-doped sapphire crystal, titanium ions enter the matrix lattice with plus three $Ti^{3+}$, replacing $Al^{3+}$ of the matrix with unequal-diameter, making crystal lattice distortion, which can greatly improve the crystal fracture strength and hardness;

(4) The obtained sapphire crystal has the following properties: density (g/cm$^3$)=6.2-7.0, hardness (HRA) is 1300-1450, bending strength (MPa) is 1300-1400, compressive resistance (MPa) is 3700-3950, thermal conductivity (W(mk))=3.1-3.3, dielectric strength (V*$10^3$))=12-14, light transmittance=80-89%;

(5) In the preparation step of red fluorescent material, after a lot of research, it is found that $B^{3+}$ doping will not change the crystal structure of the fluorescent material. However, the increase of B3+ doping will decrease the lattice constant of the fluorescent material, causing the diffraction peak position in the XRD spectrum to shift to the right. Appropriate boric acid doping can enhance the absorption of the matrix and improve the emission intensity of the fluorescent powder. In the invention hereof, Sm-ion and Na-ion are simultaneously doped on the red fluorescent material for the first time. It is found by study that the fluorescence intensity and fluorescence lifetime of the material can be effectively enhanced, and the material has excellent heat crushing resistance. In case of the temperature rising from 50K to 450K at room temperature, and the change of fluorescence intensity and fluorescence lifetime is less than 2%. Under the excitation of light in the range of ultraviolet to blue light, the material has red fluorescence covering a range of 600-860 nm and a light emitting center of 677 nm. $Na^+$ is used as a charge compensation agent to enter the crystal lattice, thus enhancing the key bonding between Sm-ion and Gd-ion. It is found by experiments that when the amount of Sm-ion and Na-ion is the same, the light intensity of the material increases by the most, about 20%;

(6) In the preparation step of the green fluorescent material, two steps are taken to synthesize the green fluorescent material, which effectively control the raw materials and sintering process and form controllability of green fluorescent powder particles. The particle size of the obtained particles is less than 10 μm, 30-50% of which is 1-3 μm, 40-50% is 3-6 μm, and 10-15% is 6-8 μm, avoiding the physical crushing process in the later stage. Adopting relatively mild ultrasonic dispersion and water precipitation method can not only maintain the crystal integrity of powder particles, but also make the particle size of powder meet the preparation requirements of industrial LED lamps. For the intermediate $Ba_{1.94}SiO_4$:0.06 $Tb^{3+}$ material obtained Step 1, after the detection by using near ultraviolet light of 360 nm as the excitation source, it is found that the emission spectrum distribution of this intermediate material has not changed, no emission band of $Tb^{3+}$ appears, but the emission intensity is obviously enhanced. This shows that $Tb^{3+}$ has a very good sensitizing effect on $Ba_{1.94}SiO_4$:0.06 $Tb^{3+}$, which can provide the required energy without affecting its emission spectrum distribution. During the monitoring, it was also found that the main excitation peak has obvious blue shift after adding $Tb^{3+}$ and the main peak is located at 375 nm and has a wider spectral width between 300 and 410 nm, indicating that the absorption of the material in the near ultraviolet region has been significantly enhanced. After a lot of research, it is found that with the increase of the concentration of $Tb^{3+}$, the sensitizing effect of $Tb^{3+}$ on the material becomes better, and the absorption of the material in the near ultraviolet region is obviously enhanced, but the emission intensity of the material decreases after exceeding a certain value of concentration of $Tb^{3+}$. It is found through research that the ratio of $Ba_{1.94}SiO_4$:0.06 $Tb^{3+}$ material is the best ratio, and the emission intensity of the material decreases if exceeding this value. In Step 2, adopt the synthesis of nitrogen oxide green fluorescent powder, use Ce element to further dope it and apply a reduction condition of 5:95 ($H_2/N_2$) in this step. It is found that after blending Tb element and Ce element by adding Ce element, the sensitizing effect is the best compared with the same amount of single Tb element or Ce element, which indicates that Ce-ion can effectively transfer the absorbed energy to Eu-ion and sensitize Tb-ion to emit light. The lighting intensity is the largest when the molar ratio of Tb element and Ce element is 3:1, and the enhancement effect is increased by 20%. The main peak has a wider spectrum width between 290-430 nm, indicating that the absorption in the near ultraviolet region has been significantly enhanced;

(7) During the preparation of the blue fluorescent material, when using near ultraviolet ray of 340 nm as the excitation source, the blue fluorescent material emits blue light, with the spectrum covering 390-670 nm and the main peak at 460 nm. Increasing the doping amount of $Tm^{3+}$ can not only cause the main emission peak of the material red shift, but also regulate the emission intensity of the material. With the increase of doping amount, the emission intensity shows a trend of increasing first and then decreasing. The emission intensity is the largest when the doping amount of $Tm^{3+}$ is 0.03 mol. Adopt compound auxiliary agent: $H_3BO_3$+$BaF_2$. Compared with a single compound auxiliary agent, the combination of compound auxiliary agent has higher emission spectrum intensity, and the obtained material particles are more even, with the average particle diameter of 4 μm, and 95% particle size is smaller than 10 μm. Coat with a layer of $MgF_2$ to the surface of blue fluorescent material with changed performance. $MgF_2$ has a very strong light transmission, so the brightness reduction of blue fluorescent material can be ignored. However, as $MgF_2$ is coated on the surface of the material, the working life of the material can be effectively enhanced, and it is found by experiments that the working life of the material is improved by 30% compared with that of the modified material.

(8) Depositing a fluorescent material film on LED components can effectively reduce light efficiency loss caused by internal reflection and scattering of the LED and obtain even color temperature in all directions. Depositing three-layer fluorescent material films of red, green and blue can obtain LED devices with high photoelectric conversion rate and high color rendering index, i.e. approximate natural light. The method is so simple that can be used for industrial production.

BRIEF DESCRIPTION OF THE DRAWINGS

FIG. 1 is the structure diagram of LED illuminating device.

SPECIFIC IMPLEMENTATION METHOD

This invention hereof will be further described below with the specific examples.

An LED illuminating device, wherein the device comprises LED components (101), LED red light source (102), an LED circuit board (100), a heat dissipator (200) and a power supply controller (400); the LED components (101) and the LED red light source (102) are disposed on the LED circuit board, the LED circuit board is disposed above the heat dissipator, and the power supply controller is connected to the LED circuit board by means of a conductive wire (300)

The LED components are used for providing an LED white light source; the power supply controller is connected to the LED circuit board by means of a conductive wire (300), and the power supply controller is also connected with an external power input line.

A preparation method of the LED illuminating device as previously mentioned includes the following steps:

Step 1: Adopt the board of sapphire as base board for the LED circuit board, and make it into LED circuit board (100);

Step 2: Deposit evenly multilayer LED fluorescent thin films on the LED components;

Step 3: Determine the power of the LED illuminating device according to the spectrum design requirements of the LED illuminating device;

Step 4: Calculate the number of LED components selected and the number of LED red light sources according to the required LED illuminating device.

The preparation method of the sapphire described in Step 1 includes the following steps:

Preparation of raw materials: adopt $\alpha$-$Al_2O_3$ as main raw material, add cubic BN, Nano $ZrO_2$ and Nano $TiO_2$, and mix the above materials in a mixing machine for 15-30 minutes; the mass ratio of $\alpha$-$Al_2O_3$, cubic BN, Nano $ZrO_2$ and Nano $TiO_2$ is 10-25:2-5:2-3:1-4; the particle diameter of the $\alpha$-$Al_2O_3$ raw material described is 0.5-5 µm, and the density is 3.98 g/cm$^3$. The grinding liquid described in step e) consists of carborundum particles of 0.1-2 µm, $Al_2O_3$ particles of 1-µm, Poly $\alpha$-olefins, N, N-Ethylene diesteramide and deionized water. The mass ratio of the carborundum particles, the $Al_2O_3$ particles, the Poly $\alpha$-olefins, the N, N-Ethylene diesteramide and the deionized water is 1-5:1-5:5-10:3-6:30-50. The particle sizes of Nano-$ZrO_2$ and Nano-$TiO_2$ particles are 1-50 nm, and the particle size of $TiO_2$ particles is smaller than that of $ZrO_2$ particles.

b) Put the raw materials into a crystal growth furnace, make it vacuum and add helium gas, heat it to 2000-2100° C. to melt the raw materials into molten state melt, and keep the temperature for 4-5 hours after melting.

c) On the upper part of the crystal growth furnace is a mould, the cross section of which is circle, and the center of which has a small hole. Through capillary action of the small hole, the melt is led into the top end of the mould. Choose directional seed crystal in C-direction to pull the melt to promote crystal growth. During the process, the surface temperature of the melt is controlled to be 2089° C., and the pulling speed is 10-20 mm/h. Reduce the temperature to 1480-1570° C. after the growth of crystal. Then cool the crystal after preserving the heat for 15-30 minutes. Control the rate of reducing the temperature at 30-60° C./h to obtain the crystal.

Cut the crystal rod with cutting equipment to obtain wafer with the required shape.

e) Grinding: Grind the wafer with a grinding machine. Add self-made grinding fluid when grinding and pressurize the wafer to 0.025-0.027 Mpa by grinding disc, the rotation speed of which is 1000-1200 rpm/min. Clean with absolute ethyl alcohol after grinding.

f) Annealing: Put the wafer into the annealing furnace. Firstly, raise the temperature to 500° C. and hold for 1-2 hours, then raise the temperature to 800° C. and hold for 2-4 hours, and then raise the temperature to 1600° C. and hold for 2-4 hours. Secondly, reduce the temperature at the rate of 210-220° C. Reduce the temperature to 1300° C. and hold for 0.5-1 hour, then reduce the temperature to 1000° C. and hold for 1-2 hours, and then reduce the temperature to 600° C. and hold for 1-3 hours. Lastly, cool the temperature to room temperature at a speed of 20-40° C./h and take out the wafer.

g) Polishing: Wash the wafer by absolute ethyl alcohol for 3-5 times, and put it into a polishing machine and fix it. Add polishing liquid during polishing. The rotating speed of the polishing disc is 1000-1500 rpm/min. Rinse the polished wafer with absolute ethyl alcohol and then cool it naturally at room temperature. The polishing liquid components described consist of cerium oxide micron particles, alkyl glycoside, hydroxymethyl cellulose sodium, glycerol, hydroxyethyl diamine and deionized water; the mass ratio of cerium oxide particles, alkyl glycoside, hydroxymethyl cellulose sodium, glycerol and deionized water is 1-5:10-15:6-8:5-10:30-50. Hydroxyethyl diamine is used to control the pH of the polishing liquid so that the polishing liquid is an alkaline solution with a pH value of 8-10.

In step 2, depositing an even multilayer LED fluorescent film on the LED device includes the following steps:

(1) Preparation of Red Fluorescent Materials:

The raw material uses $Gd(NO_3)_3 \cdot 6H_2O$, $Li_2CO_3$, $MgCO_3$, $Nb_2O_5$, $H_3BO_3$, $Sm_2O_2$, $Na_2CO_3$ and deionized water; the molar ratio of $Gd(NO_3)_3 \cdot 6H_2O$, $Li_2CO_3$, $MgCO_3$, $Nb_2O_5$, $H_3BO_3$, $Sm_2O_2$ and $Na_2CO_3$ is $(1-x-y):1-2:1-2:1-2:1-2:x:y$ ($0.01 \leq x \leq 0.08$, $x/y=1-2$); the mass ratio of $Gd(NO_3)_3 \cdot 6H_2O$ and deionized water is 1:1-2; add $Gd(NO_3)_3 \cdot 6H_2O$, $Li_2CO_3$, $MgCO_3$, $Nb_2O_5$, $Sm_2O_2$ and $Na_2CO_3$ into deionized water to form a turbid liquid; Stir the turbid liquid at the condition of 50-60° C. for 30-45 minutes and dropwise add $H_3BO_3$; after that, rinse the sediment with deionized water for 3-5 times and dry it in the drying case; blend evenly the dried materials by ball-milling and put into crucible for sintering for 4-5 hours at 450° C. in the heating chamber; raise the temperature to 1000-1200° C. and bake for 15-20 hours, then naturally cool the temperature to room temperature; grind the baked product to obtain the $Gd_{1-x-y}Li_3Mg_2(NbO_6)(BO_3):xSm^{3+},yNa^{1+}$, Whereby x=0.02 and y=0.02. The obtained red fluorescent material is $Gd_{0.96}Li_3Mg_2(NbO_6)(BO_3):0.02Sm^{3+}, 0.02 Na^{1+}$, and the particle diameter of the material is less than 10 µm, of which the particle diameter of 1-6 µm accounts for 75%.

Preparation of Green Fluorescent Materials:

a) Weigh and take $BaCO_3$, $SiO_2$ and $Tb_2O_3$, put them into container and add ethanol and then place them into a crucible after mixing and fully grinding. Put the crucible in a sintering furnace, raise the temperature to 1200~1300° C. with nitrogen, and conduct sintering for 3-6 hours (the gas flow rate of the nitrogen is 30 ml/min). Reduce the temperature to 900° C. for sintering for 2 hours, and cool to obtain an intermediate $Ba_{1.94}SiO_4:0.06\ Tb^{3+}$. The molar ratio of $BaCO_3$, $SiO_2$ and $Tb_2O_3$ is 1-2:1-2:0.01-0.1. The mass ratio of $BaCO_3$ and ethanol is 1:2-3;

b) Blend the intermediate $Ba_{1.94}SiO_4:0.06\ Tb^{3+}$, $\alpha$-$Si_3N_4$ and $Ce_2O_3$, and then add $H_3BO_3$. Grind the above components and put into a molybdenum crucible, and transfer the molybdenum crucible into a high temperature furnace. Sinter at 1400° C. for 3-6 hours in the condition of $N_2:H_2=95:5$ (the gas flow rate is controlled within 25 ml/min). After that, cool to room temperature and take out, obtaining synthesizing powder $Ba_{0.92}Si_2O_2N_2:0.06\ Tb^{3+}$, $0.02\ Ce^{3+}$. Place the powder into isopropanol (the mass ratio of the powder and isopropanol is 1:1-2) and disperse it with ultrasonic crusher for 1-2 hours. Dry the dispersed powder to obtain nitrogen oxide of green fluorescent powder $Ba_{0.92}Si_2O_2N_2:0.06\ Tb^{3+}$, $0.02\ Ce^{3+}$. The mass ratio of $Ba_{1.94}SiO_4:0.06\ Tb^{3+}$, a $Si_3N_4$ and $H_3BO_3$ is 2-4:1-2:0.01-0.1. The molar ratio of Tb element and Ce element is 3:1.

Preparation of Blue Fluorescent Materials:

a. Mix $BaCO_3$, MgO, $CaCO_3$, $NH_4H_4PO_4$ and Tm $(NO_3)_3.5H_2O$ with a molar ratio of 1−n:1:1:2:n in an agate mortar, add compound auxiliary agent and grind for 40-60 minutes, take out and put into a crucible. Conduct pre-sintering at 900° C. for 2-3 hours, take out the sample after natural cooling and grind furtherly for 40-60 minutes. Put the sample into the crucible again, sinter at 1200° C. for 3-6 hours under the condition of $N_2:H_2=95:5$, and then naturally cool to room temperature, obtaining blue fluorescent powder of $Ba_{1-n}MgCa(PO_4)_2:nTm^{3+}$.

b) b. Change the property of blue fluorescent powder: add distilled water to the previously prepared $Ba_{1-n}MgCa(PO_4)_2:nTm^{3+}$ to form turbid solution after fully dispersing. Add $MgF_2$ sol and make into a mixture. After dispersing it with ball-milling for 30-60 minutes, dry it at 100° C. And then place at 500° C. for 2-3 hours, obtaining the blue fluorescent material that has change property. The mass ratio of blue fluorescent powder, distilled water and $MgF_2$ sol is 1-2:2-3:0.05-0.5. The obtained blue fluorescent powder is $Ba_{0.97}MgCa(PO_4)_2:0.03Tm^{3+}$. The compound auxiliary agent consists of $H_3BO_3+BaF_2$ with a mass ratio of 1:1 and its mass is 10% of $BaCO_3$. The particle size of the blue fluorescent powder is less than 10 μm, of which the size of 1-5 μm accounts for 70%.

(4) Deposit the first layer of red fluorescent material, the second layer of green fluorescent material and the third layer of blue fluorescent material on the LED components respectively by a Chemical Vapor Deposition Method to form an LED fluorescent thin film.

In the deposition process, let the red fluorescent material as the first layer, the green fluorescent material as the second layer, and blue fluorescent material as the third layer. The deposition method of the first layer of red fluorescent material is as follows: dissolve the red fluorescent material into the mixed solvent to form first solutions with a concentration of 0.1 mol/l (The mixed solvent consists of tetrahydrofuran and 2-Ethylhexanoic Acid with a molar ratio of 3:2.5). Heat the first solution to 350° C., hold the temperature for 30-60 minutes, and then feed it into a gasification chamber to gasify the solution to form a first mixed gas. Transport the first mixed gas to the LED components in the reactor at a flow rate of 4000 sccm through argon gas (The temperature in the reactor is 300° C.) and place it quiet for 30-45 minutes after the convey. After that, raise the temperature of the device to 800° C., and hold the temperature for 30-60 min to obtain a first layer of fluorescent film formed on the LED device. Repeat the above steps to deposit the second layer of green fluorescent material and the third layer of blue fluorescent material on the LED device to form three layers of LED fluorescent films little by little. The thickness of each coating film is 0.2-μm, and 0.5 μm is preferred.

Then determine the power of the LED illuminating device according to the spectrum design requirements of the LED illuminating device. Finally, calculate the number of LED components selected and the number of LED red light sources according to the required LED illuminating device.

Modulate a visible spectrum range reaching 370-720 nm by using over one set of LED white light sources and over one set of LED red light sources, which is very close to natural light.

The LED white light source and the LED red light source have the following properties:

(1) The CRI of the LED white light source is greater than 90, 95-100 is preferred; R9 is greater than 80, 85-90 is preferred, and R12 is greater than 70, 75 is preferred.

(2) The wavelength of the LED red light source is greater than 620 nm.

As a preferred method of the above implementation examples, the power ratio of the LED white light source 101 to the LED red light source 102 is 3-10:1.

As a preferred method of the above implementation examples, when the power of a single LED white light source and a single LED red light source is the same, the quantity ratio of the LED white light source 101 to the LED red light source 102 is 3-10:1.

As a preferred method of the above implementation examples, the ratio of the luminous flux value of the LED white light source to the light radiation power value of the LED red light source is 1-3:1.

As an Implementation Example

1) The CRI of the prepared white light source 101 is 95-100, R9 is 85-90, R12 is 75, the rated working current is 150 mA, the rated working voltage is 2.9-3.4V, and the quantity of LED white light sources is 12.

2) Select two sets of LED red light sources 102 with different wavelengths. The power of a single LED red light source 102 is 0.5 W, the rated working current is 150 mA, and the rated working voltage is 2.0-2.6V. The wavelengths of the two sets of LED red light sources 102 are 650-660 nm (the quantity is 2) and 680-700 nm (the quantity is 2), respectively.

3) Design the LED circuit board and heat dissipator according to the installation requirements and connection methods of the above three light sources.

The connection method of the three sets of LED devices above-mentioned is as follows: two in parallel and eight in series. The lamp beads of 12 LED white light source are connected two in parallel and six in series and two sets of the lamp beads (the quantity is 4) of LED red light source are connected in two in parallel and two in series, then link them together in series, that is, two in parallel and eight in series.

The electro-optic conversion efficiency (lm/W) of the prepared LED illuminating device is 90-125, the CRI is 95-100, and the working life of the product is (L70, h)60000-115000 (L70 represents the working time when the luminous maintenance rate of the LED is 70%).

It should be understood that these implementation examples are only for the purpose of explaining the invention hereof and are not used to limit the scope of the invention hereof. It should also be understood that after reading the contents of the invention hereof, technical personnel in the field can make various changes or modifications to the invention hereof, and these equivalent forms also belong to the scope defined by the appended right claim documents of this application.

The invention claimed is:

1. Preparation method of an LED illuminating device, wherein the device comprises LED components (101), LED red light source (102), an LED circuit board (100), a heat dissipator (200) and a power supply controller (400); the LED components (101) and the LED red light source (102) are disposed on the LED circuit board, the LED circuit board is disposed above the heat dissipator, the power supply controller (400) is connected to the LED circuit board by means of a conductive wire (300), and the power supply controller is also connected with an external power input line, the LED components are used for providing an LED white light source;

the LED illuminating device is prepared by the following method:

Step 1: Adopt the board of sapphire as base board for the LED circuit board, and make it into LED circuit board (100);

Step 2: Deposit evenly multilayer LED fluorescent thin films on the LED components, including:

(1) Preparation of red fluorescent materials:

The raw material uses $Gd(NO_3)_3 \cdot 6H_2O$, $Li_2CO_3$, $MgCO_3$, $Nb_2O_5$, $H_3BO_3$, $Sm_2O_2$, $Na_2CO_3$ and deionized water; the molar ratio of $Gd(NO_3)_3 \cdot 6H_2O$, $Li_2CO_3$, $MgCO_3$, $Nb_2O_5$, $H_3BO_3$, $Sm_2O_2$ and $Na_2CO_3$ is (1−x−y):1-2:1-2:1-2:1-2:x:y ($0.01 \leq x \leq 0.08$, x/y=1-2); the mass ratio of $Gd(NO_3)_3 \cdot 6H_2O$ and deionized water is 1:1-2; add $Gd(NO_3)_3 \cdot 6H_2O$, $Li_2CO_3$, $MgCO_3$, $Nb_2O_5$, $Sm_2O_2$ and $Na_2CO_3$ into deionized water to form a turbid liquid; Stir the turbid liquid at the condition of 50-60° C. for 30-45 minutes and dropwise add $H_3BO_3$; after that, rinse the sediment with deionized water for 3-5 times and dry it in the drying case; blend evenly the dried materials by ball-milling and put into crucible for sintering for 4-5 hours at 450° C. in the heating chamber; raise the temperature to 1000-1200° C. and bake for 15-20 hours, then naturally cool the temperature to room temperature; grind the baked product to obtain the $Gd_{1-x-y}Li_3Mg_2(NbO_6)(BO_3):xSm^{3+},yNa^{1+}$;

(2) Preparation of green fluorescent materials:

A) Weigh and take $BaCO_3$, $SiO_2$ and $Tb_2O_3$, put them into container and add ethanol and then place them into a crucible after mixing and fully grinding; put the crucible in a sintering furnace, raise the temperature to 1200~1300° C. with nitrogen, and conduct sintering for 3-6 hours (the gas flow rate of the nitrogen is 30 ml/min); reduce the temperature to 900° C. for sintering for 2 hours, and cool to obtain an intermediate $Ba_{1.94}SiO_4:0.06\ Tb^{3+}$; the molar ratio of $BaCO_3$, $SiO_2$ and $Tb_2O_3$ is 1-2:1-2:0.01-0.1; the mass ratio of $BaCO_3$ and ethanol is 1:2-3;

B) Blend the intermediate $Ba_{1.94}SiO_4:0.06\ Tb^{3+}$, $\alpha$-$Si_3N_4$ and $Ce_2O_3$, and then add $H_3BO_3$; grind the above components and put into a molybdenum crucible, and transfer the molybdenum crucible into a high temperature furnace; sinter at 1400° C. for 3-6 hours in the condition of $N_2:H_2=95:5$ (the gas flow rate is within 25 ml/min); after that, cool to room temperature and take out, obtaining synthesizing powder $Ba_{0.92}Si_2O_2N_2:0.06\ Tb^{3+}$, $0.02\ Ce^{3+}$; place the powder into isopropanol (the mass ratio of the powder and isopropanol is 1:1-2) and disperse it with ultrasonic crusher for 1-2 hours; dry the dispersed powder to obtain nitrogen oxide of green fluorescent powder $Ba_{0.92}Si_2O_2N_2:0.06\ Tb^{3+}$, $0.02\ Ce^{3+}$; the mass ratio of $Ba_{1.94}SiO_4:0.06\ Tb^{3+}$, $\alpha$-$Si_3N_4$ and $H_3BO_3$ is 2-4:1-2:0.01-0.1; the molar ratio of Tb element and Ce element is 3:1;

(3) Preparation of blue fluorescent materials:

A) Blend $BaCO_3$, MgO, $CaCO_3$, $NH_4H_2PO_4$, $Tm(NO_3)_3 \cdot 5H_2O$ with a molar ratio of 1−n:1:1:2:n in an agate mortar, add compound auxiliary agent and grind for 40-60 minutes, take out and put into a crucible; conduct pre-sintering at 900° C. for 2-3 hours, take out the sample after natural cooling and grind furtherly for 40-60 minutes; put the sample into the crucible again, sinter at 1200° C. for 3-6 hours under the condition of $N_2:H_2=95:5$, and then naturally cool to room temperature, obtaining blue fluorescent powder of $Ba_{1-n}MgCa(PO_4)_2:nTm^{3+}$;

B) Change the property of blue fluorescent powder: add distilled water to the previously prepared $Ba_{1-n}MgCa(PO_4)_2:nTm^{3+}$ to form turbid solution after fully dispersing; add sol and make into a mixture; after dispersing it with ball-milling for 30-60 minutes, dry it at 100° C.; and then place at 500° C. for 2-3 hours, obtaining the blue fluorescent material that has change property; the mass ratio of blue fluorescent powder, distilled water and $MgF_2$ sol is 1-2:2-3:0.05-0.5;

(4) Deposit the first layer of red fluorescent material, the second layer of green fluorescent material and the third layer of blue fluorescent material on the LED components respectively by a Chemical Vapor Deposition Method to form an LED fluorescent film;

Step 3: Determine the power of the LED illuminating device according to the spectrum design requirements of the LED illuminating device;

Step 4: Calculate the number of LED components selected and the number of LED red light sources according to the required LED illuminating device.

2. The preparation method of an LED illuminating device according to claim 1, wherein, the preparation method of the sapphire described in Step 1 includes the following steps:

a) Preparation of raw materials: adopt $\alpha$-$Al_2O_3$ as a main raw material, add cubic BN, Nano $ZrO_2$ and Nano $TiO_2$, and mix the above materials in a mixing machine for 15-30 minutes; the mass ratio of $\alpha$-$Al_2O_3$, cubic BN, Nano $ZrO_2$ and Nano $TiO_2$ is 10-25:2-5:2-3:1-4;

b) Put the raw materials into a crystal growth furnace, make it vacuum and add helium gas, heat it to 2000-2100° C. to melt the raw materials into molten state melt, ad keep the temperate for 4-5 hours after melting;

c) On the upper pant of the crystal growth furnace is a mould, the cross section of which is circle, and the center of which has a small hole. Through capillary action of the small hole, the melt is led into the top end of the mould; choose directional seed crystal in C-direction to pull the melt to promote crystal growth; during the process, the surface temperature of the melt is controlled to be 2089° C., and the pulling speed is 10.20 mm/h; reduce the temperature to 1480-1570° C. after the growth of crystal; then cool the crystal after preserving the heat for 15-30 minutes. Control the rate of reducing the temperature at 30-60° C./h to obtain the crystal;

d) Cut the crystal rod with cutting equipment to obtain wafer with the required shape;

e) Grinding: Grind the wafer with a grinding machine. Add self-made grinding fluid when grinding and pressurize the wafer to 0.025-0.027Mpa by grinding disc, the rotation speed of which is 1000-1200 rpm/min; clean with absolute ethyl alcohol after grinding; the grinding liquid consists of carborundum particles of 0.1-2 μm, $Al_2O_3$ particles of 1-μm, Poly $\alpha$-olefins, N, N-Ethylene, diesteramide and deionized water, the mass ratio of the carborundum particles, the $Al_2O_3$ particles, the Poly $\alpha$-olefins, the N, N-Ethylene diesteramide and the deionized water is 1-5:1-5:5-10:3-6:30-50;

f) Annealing: Put the wafer into the annealing furnace; firstly, raise the temperature to 500° C. and hold for 1-2 hours, then raise the temperature to 800° C. and hold for 2-4 hours, and then raise the temperature to 1600° C. and hold for 2-4 hours; secondly, reduce the temperature at the rate of 210-220° C.; reduce the temperature to 1300° C. and hold for 0.5-1 hour, then reduce the temperature to 1000° C. and hold for 1-2 hours, and then reduce the temperature to 600° C. and hold for 1-3 hours; lastly, cool the temperature to room temperature at a speed of 20-40° C./h and take out the wafer;

g) Polishing: Wash the wafer by absolute ethyl alcohol for 3-5 times, and put it into a polishing machine and fix it; add polishing liquid during polishing; the rotating speed of the polishing disc is 1000-1500 rpm/min; rinse the polished wafer with absolute ethyl alcohol and then cool it naturally at room temperature.

3. The preparation method of an LED illuminating device according to claim 1, wherein the particle diameter of the α-$Al_2O_3$ raw material described in the step a) is 0.5-5 μm, and the density is 3.98 g/cm³; μm $Al_2O_3$ μm $Al_2O_3$ the polishing liquid described in step g) consists of cerium oxide micron particles, alkyl glycoside, hydroxymethyl cellulose sodium, glycerol, hydroxyethyl diamine and deionized water. The mass ratio of cerium oxide particles, alkyl glycoside, hydroxymethyl cellulose sodium, glycerol and deionized water is 1-5:10-15:6-8:5-10:30-50. Hydroxyethyl diamine is used to control the pH of the polishing liquid so that the polishing liquid is an alkaline solution with a pH value of 8-10.

4. The preparation method of an LED illuminating device according to claim 1, wherein, in the preparation of the red fluorescent material, x=0.02 and y=0.02; the obtained red fluorescent material is $Gd_{0.96}Li_3Mg_2(NbO_6)(BO_3)$:0.02$Sm^{3+}$, 0.02 $Na^{1+}$; the particle size of the material is less then 10 μm, of which the size of 1-6 μm accounts for 75%; in the preparation of the blue florescent material, n=0.03. The obtained blue fluorescent powder is $Ba_{0.97}MgCa(PO_4)_2$:0.03$Tm^{3+}$; the compound auxiliary agent consists of $H_3BO_3$+$BaF_2$ with a mass ratio of 1:1 and its mass is 10% of $BaCO_3$; the particle size of the blue fluorescent powder is less than 10 μm, of which the size of 1-5 μm accounts for 70%.

5. The preparation method of an LED illuminating device according to claim 1, wherein, in step 2, three layers of LED fluorescent films are evenly deposited on the LED components.

* * * * *